United States Patent [19]
Prasad et al.

[11] Patent Number: 5,855,648
[45] Date of Patent: Jan. 5, 1999

[54] SOLID ELECTROLYTE SYSTEM FOR USE WITH FURNACES

[75] Inventors: Ravi Prasad, East Amherst; Raymond Francis Drnevich, Clarence Center; Homer Fay, Snyder, all of N.Y.

[73] Assignee: Praxair Technology, Inc., Danbury, Conn.

[21] Appl. No.: 868,964

[22] Filed: Jun. 5, 1997

[51] Int. Cl.⁶ .................................................. B01D 53/22
[52] U.S. Cl. ............................................ 095/54; 095/288
[58] Field of Search .................. 95/45, 47, 54, 95/288

[56] References Cited

U.S. PATENT DOCUMENTS

| | | | |
|---|---|---|---|
| 4,545,787 | 10/1985 | Hegarty | 55/16 |
| 4,560,394 | 12/1985 | McDonald et al. | 95/54 |
| 5,108,465 | 4/1992 | Bauer et al. | 95/54 |
| 5,118,395 | 6/1992 | Chen et al. | 95/54 X |
| 5,169,415 | 12/1992 | Roettger et al. | 95/54 |
| 5,174,866 | 12/1992 | Chen et al. | 95/54 X |
| 5,244,489 | 9/1993 | Grenier | 75/466 |
| 5,268,019 | 12/1993 | Rathbone | 75/466 |
| 5,317,862 | 6/1994 | Rathbone | 60/39.05 |
| 5,516,359 | 5/1996 | Kang et al. | 95/14 |
| 5,547,494 | 8/1996 | Prasad et al. | 95/54 |
| 5,562,754 | 10/1996 | Kang et al. | 95/54 |
| 5,582,036 | 12/1996 | Drnevich et al. | 62/656 |
| 5,643,354 | 7/1997 | Agrawal et al. | 75/490 |
| 5,712,220 | 1/1998 | Carolan et al. | 95/54 X |
| 5,753,007 | 5/1998 | Russek et al. | 95/41 |

FOREIGN PATENT DOCUMENTS 0747108 12/1996 European Pat. Off. .

Primary Examiner—Robert H. Spitzer
Attorney, Agent, or Firm—Douglas E. Denninger

[57] ABSTRACT

A process for oxygen-enriching a first feed gas stream be fed into a furnace by utilizing an oxygen-enriched gas stream from a second feed gas stream, wherein the first feed gas stream is compressed and then heated prior to injection into the furnace. The second feed gas stream is separated using an ion transport module containing an ion transport membrane having a retentate side and a permeate side to produce an oxygen-depleted gas stream on the retentate side and the pure oxygen gas stream or the oxygen-enriched gas stream on the permeate side. The pure oxygen gas stream or the oxygen-enriched gas stream is added to the first feed gas stream at any location before the first feed gas stream enters the furnace.

16 Claims, 8 Drawing Sheets

SOLID ELECTROLYTE SYSTEM FOR USE WITH FURNACES

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

The invention relates to an apparatus and process for the use of solid electrolyte ionic conductor systems for separating oxygen from air to produce oxygen or oxygen-enriched air and, more particularly, to an apparatus and process utilizing such solid electrolyte systems with furnaces.

BACKGROUND OF THE INVENTION

The operation of blast furnaces typically consumes large quantities of air, which provides the oxygen for the oxidation reactions that occur therein. The operators of blast furnaces have been switching to powdered coal injection to reduce the amount of coke necessary for the production of iron from ore. With this change, the air to the blast furnace has to be enriched with oxygen to maintain the blast furnace production rate. This has created a need to produce oxygen-enriched air for use with blast furnaces. The oxygen requirement for such a blast furnace is more than 0.1 ton of oxygen per ton of iron. Consequently, the cost of oxygen becomes an important factor in the cost of producing iron.

Air is a mixture of gases which may contain varying amounts of water vapor and, at sea level, has the following approximate composition by volume: oxygen (20.9%), nitrogen (78%), argon (0.94%), with the balance consisting of other trace gases. Since only the oxygen fraction of the gas injected into the blast furnace (for example, air) is consumed by combustion, the other components of the gas (for example, nitrogen and argon) are usually discharged from the gas furnace chemically unchanged. These unreacted discharge gases, however, have been heated in the process and therefore contribute to the energy inefficiency of the process, since much of this heat cannot be recovered.

The basic means for supplying oxygen-enriched air to the blast furnace involves taking normal purity oxygen (99.5 mol %) from an air separation unit designed for supplying the basic oxygen furnace (BOF) and mixing the gas with the blast air prior to entering the blast furnace stoves. Often the oxygen used for enriching the air is at an elevated pressure needed for BOF (>200 psia) operations.

An alternative method is to use a low purity (70–90 mol %) oxygen plant to produce oxygen using less power than a high purity oxygen plant and mix this oxygen gas with the air from the blast air blower.

Because of this need for oxygen for use in blast furnaces, there is a demand for the development of more efficient processes for producing oxygen or oxygen-enriched air for use in blast furnace operations. The invention meets this demand by integrating gas separation processes to produce oxygen or oxygen-enriched air with the blast furnaces they supply so as to enhance the efficiency of the overall process.

Solid electrolyte ionic conductors offer a potentially attractive technology for the separation of oxygen from air. The solid electrolyte process may be operated using the ionic conductors in an electrically-driven mode or mixed conductors in a pressure-driven mode. Two unique features of the solid electrolyte process are that the process operates at high temperatures (~600°–1000° C.) and produces oxygen with an infinite selectivity of oxygen to nitrogen. These features make the solid electrolyte process well suited for integration into a high temperature process such as blast furnace operation.

The basis for the operation of ion transport membrane is that it efficiently transports oxygen ion vacancies at high temperatures. Electrically-driven ion transport membranes, when exposed to differential oxygen partial pressure on both sides of the membrane, will allow a spontaneous voltage (the Nernst potential) to develop that is logarithmically dependent on the oxygen partial pressure across the membrane. Conversely, when an external voltage in excess of the Nernst potential is applied, oxygen in the form of oxide ions can be pumped across the membrane against the partial pressure gradient. This pumping requires an electrical current and, while this type of process is capable of producing oxygen at elevated pressure and temperature, the cost of the electrical energy required is high.

More recently, solid electrolyte materials have been developed that can transport oxygen ion vacancies at high temperature and are also electronic conductors. For such materials, the counter-current to the flow of oxygen ion vacancies is carried by an internal flow of electrons, rather than through an external circuit. No electrodes are required and the entire transport is driven by the oxygen partial pressure in the gas streams on either side of the ion transport membrane. No electrical energy need be supplied and this type of process is more readily integrated with the blast furnace equipment and is a more attractive means for supplying oxygen or oxygen-enriched air for the blast furnace.

There are therefore two types of ion transport membranes in use: ionic conductors that conduct only ions through the membrane, which require electrodes and an external circuit to enable flow of electrons, and mixed conductors that conduct both ions and electrons through the membrane. As used herein, the terms "solid electrolyte ionic conductor", "solid electrolyte ion transport membrane", "solid electrolyte" or "ion transport membrane" are generally used to designate either an ionic-type (electrically-driven) system or a mixed conductor-type (pressure-driven) system unless otherwise specified.

Although the ion transport process is capable of producing pure oxygen, the best mode of practice for this application involves the use of air, or a gas with a lower oxygen partial pressure than the feed gas stream, as a purge gas stream for the permeate side of the ion transport membrane. This reduces the oxygen partial pressure and enhances the oxygen transport through the membrane leading to a greater oxygen recovery. The product from such an ion transport module is oxygen-enriched air, rather than pure oxygen, but this is suitable for injection into the feed or the blast air stream to elevate the oxygen concentration of the hot blast air.

Solid electrolyte ion transport technology is described in more detail in Prasad et al., U.S. Pat. No. 5,547,494, entitled Staged Electrolyte Membrane, which is hereby incorporated by reference to more fully describe the state of the art.

Advances in the state of the art of air separation using inorganic oxide membranes have been presented in the technical literature. In addition, schemes have been proposed (for example, Rathbone, U.S. Pat. No. 5,268,019, see below) in which gas turbines that are fueled with blast furnace gas are integrated with air separation units to provide reduced purity oxygen for blast air enrichment.

Hegarty, U.S. Pat. No. 4,545,787, entitled *Process for Producing By-Product Oxygen from Turbine Power Generation*, relates to a method of generating power from a compressed and heated air stream by removing oxygen from the air stream, combusting a portion of the resultant air stream with a fuel stream, combining the combustion effluent with another portion of the resultant air stream, and expanding the final combustion product through a turbine to generate power. Hegarty mentions the use of silver composite membranes and composite metal oxide solid electrolyte membranes for removing oxygen from the air stream.

Kang et al., U.S. Pat. No. 5,516,359, entitled *Integrated High Temperature Method for Oxygen Production*, relates to a process for separating oxygen from heated and compressed air using a solid electrolyte ionic conductor membrane where the nonpermeate product is heated further and passed through a turbine for power generation.

Rathbone, U.S. Pat. No. 5,268,019, entitled *Air Separation Method and Apparatus Combined with a Blast Furnace*, relates to a means of integrating an air separation plant with a blast furnace. The method does not involve solid electrolytes and, therefore, makes no use of thermal integration.

Rathbone, U.S. Pat. No. 5,317,862, entitled *Air Separation*, relates to the use of pressurized nitrogen to generate power and improve the heat balance of a process integrated with a blast furnace.

Grenier, U.S. Pat. No. 5,244,489, entitled *Process for Supplying a Blast Furnace with Air Enriched in Oxygen, and Corresponding Installation for the Reduction of Iron Ore*, relates to a means for integrating a cryogenic air separation plant with a blast furnace. No solid electrolytes are employed and the invention involves the use of the blast air blower in combination with a low purity air separation concept known as the mixing column process. This is a cryogenic process similar to the standard double column, but with the addition of a third column wherein liquid is contacted with air to produce a low purity stream to mix with the blast air entering the stoves.

OBJECTS OF THE INVENTION

It is therefore an object of the invention to provide an efficient method of integrating a solid electrolyte ionic conductor system into an oxygen production unit for providing an oxygen-enriched gas stream to a furnace.

It is a further object of the invention to increase the efficiency of the process by purging the ion transport membrane with a portion of the hot blast air, a portion of the nitrogen waste stream, a reactive fuel gas, or other low concentration oxygen gas.

It is another object of the invention to increase the efficiency of the overall system by integrating the stages of the process using conduits, heat exchangers, coolers, combustors, power expanders, and other equipment at appropriate points in the system to recover and transfer energy.

SUMMARY OF THE INVENTION

The invention comprises a process for oxygen-enriching a first feed gas stream containing elemental oxygen and at least one other gas to be fed into a furnace by utilizing a pure oxygen gas stream or an oxygen-enriched gas stream obtained from a second feed gas stream containing elemental oxygen and at least one other gas. During the process, the first feed gas stream is compressed. The second feed gas stream is separated using an ion transport module containing an ion transport membrane having a retentate side and a permeate side to produce an oxygen-depleted gas stream on the retentate side and the pure oxygen gas stream or the oxygen-enriched gas stream on the permeate side. At least the first feed gas stream is heated prior to injection into the furnace. The pure oxygen gas stream or the oxygen-enriched gas stream is then added to the first feed gas stream at any location before the first feed gas stream enters the furnace.

In a preferred embodiment of the invention, the furnace is a blast furnace. In another preferred embodiment of the invention, the second feed gas stream comprises at least a portion of the compressed first feed gas stream or a compressed oxygen-enriched feed gas stream. In yet another preferred embodiment of the invention, at least a portion of the oxygen-depleted gas stream or the second feed gas stream is used as a purge stream to purge the permeate side of the ion transport membrane. In another preferred embodiment of the invention, at least a portion of the first gas stream is added, after being heated, to the second feed gas stream. In still another preferred embodiment, the second feed gas stream is heated by transferring heat from the pure oxygen gas stream or oxygen-enriched gas stream and the oxygen-depleted gas stream to the second feed gas stream. In yet another preferred embodiment, a power expander recovers energy from the oxygen-depleted gas stream. In another preferred embodiment, a fuel gas stream is added to the permeate side of the ion transport membrane for purging.

BRIEF DESCRIPTION OF THE DRAWINGS

Other objects, features and advantages of the invention will occur to those skilled in the art from the following description of preferred embodiments and the accompanying drawings, in which.

DETAILED DESCRIPTION OF THE INVENTION

The essence of the invention is to form an integrated process wherein compressed air from the blast air blower is used as the feed for the solid electrolyte device, thereby eliminating the need for a separate compressor. A portion of the hot blast air can be used to supply the heat needed to maintain the solid electrolyte module operating temperature, thereby eliminating or reducing the fuel required for the oxygen-enriched air stream that enhances the operation of the blast furnace.

The preferred embodiments of the invention make use of some of the compression energy and some of the heat from the blast furnace equipment to assist in the operation of the ion transport process, producing oxygen or oxygen-enriched air for the enhancement of the effectiveness of the hot air blast to the furnace. By integration of the ion transport module with the blast furnace equipment, the energy and cost of the oxygen enrichment process can be reduced and the overall process made more efficient.

There are several different ways that an ion transport module can be combined or integrated with the operation of a blast furnace. Some of these ways are only partly integrated and may not be highly efficient; they are described for illustrative purposes. The preferred embodiments are highly integrated and should offer an efficient and practical means for enhancing the operation of the blast furnace.

The invention is described with reference to the Figures. In general, the preferred concentration of oxygen-enriched air injected into a furnace such as a blast furnace is between 25–27% oxygen by volume. The process may be adapted to achieve this or another desired oxygen concentration. There are several advantages and features of the invention which are illustrated in the embodiments of the inventions presented in the Figures. These features include heat management and thermal integration of the various components of the process, the possibility of utilizing existing machinery and retrofitting the components necessary to convert an existing blast furnace to the present invention, the use of a purge gas stream to enhance the efficiency of the ion transport membrane, and the use of a turbine to recover energy from high pressure gas streams.

Figure 1:
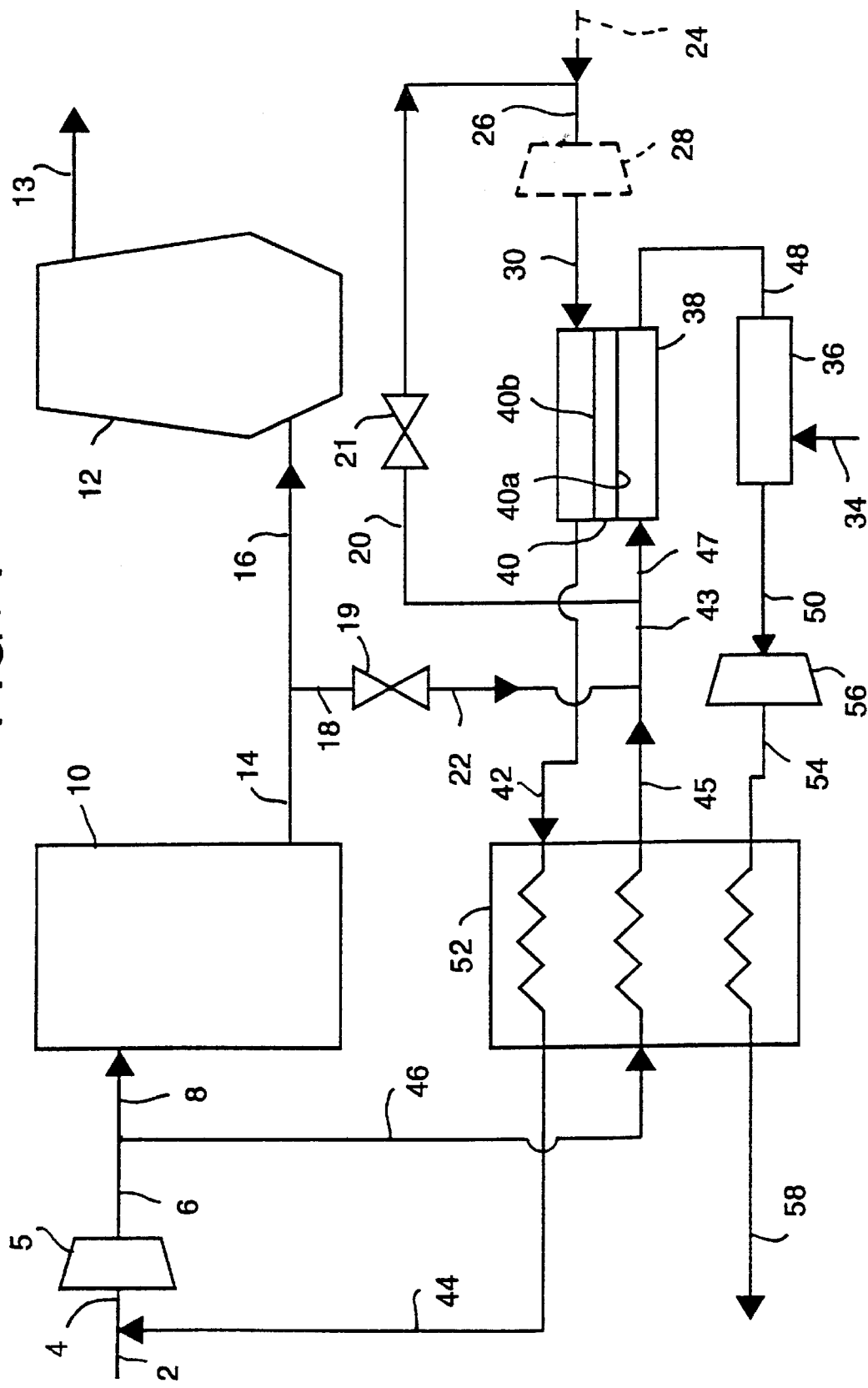
FIG. 1 is a schematic diagram of an embodiment of the invention showing the ion transport module with a blast furnace where fuel gas stream is added to a combustor in the waste gas stream.

There are many alternative embodiments of the invention presented in the figures illustrating various aspects of the invention. For example, FIG. 1 is a schematic diagram showing the addition of fuel gas stream to a combustor in the waste gas stream. This arrangement would only be employed for trimming the temperature or as a source of added heat should it be impractical to tap and utilize the hot blast stream and thus have only the warm air stream available for purging or if it is desired to produce more power from the turbine by elevating its inlet temperature. During operation, oxygen-enriched gas stream 44 is added to feed gas stream 2 to make gas stream 4 which is fed into blast air blower 5. Compressed feed gas stream 6 from blast air blower 5 is divided into gas stream 8 which is fed into stoves 10 and into gas stream 46 which is diverted through heat exchanger 52 where its temperature is raised by heat transfer with hot oxygen-enriched gas stream 42 and hot waste gas stream 54 from ion transport module 38 to form heated gas stream 45. Gas stream 14 from stoves 10 is divided into gas stream 16, which is fed into blast furnace 12, and gas stream 18, which passes through valve 19 to become gas stream 22. Hot exhaust gas stream 13 leaves blast furnace 12. Gas stream 22 joins heated gas stream 45 to become gas stream 43. Gas stream 43 is divided into gas stream 47 and gas stream 20. Gas stream 47 is fed to the retentate side 40a of ion transport membrane 40. Gas stream 20 passes through valve 21 to become purge gas stream 26. Fuel gas stream 24, that is, a reactive gas subject to combustion with oxygen, is optionally added to purge gas stream 26 and eventually burned within ion transport module 38. Purge gas stream 26 can go through optional expander 28 instead of valve 21 so that some of the compression energy is recovered, and then forms purge gas stream 30. Purge gas stream 30 is flowed on the permeate side 40b of ion transport membrane 40 in a direction counter-current to the flow on the retentate side 40a of ion transport membrane 40. By controlling the blending of gas stream 22 and gas stream 45, ion transport module 38 can be maintained at the proper operating temperature. Low pressure oxygen-enriched product gas stream 42 is cooled in heat exchanger 52 to form oxygen-enriched gas stream 44 which is injected into feed air stream 2 to increase the oxygen concentration of blast air stream 16. Nitrogen-rich waste gas stream 48, is passed through optional combuster 36 where fuel gas stream 34 is added and combustion takes place. Waste gas stream 50 passes through expander 56 where some of the compression energy is recovered to form gas stream 54. Gas stream 54 goes through heat exchanger 52 to form gas stream 58, which is generally discarded.

Figure 2:
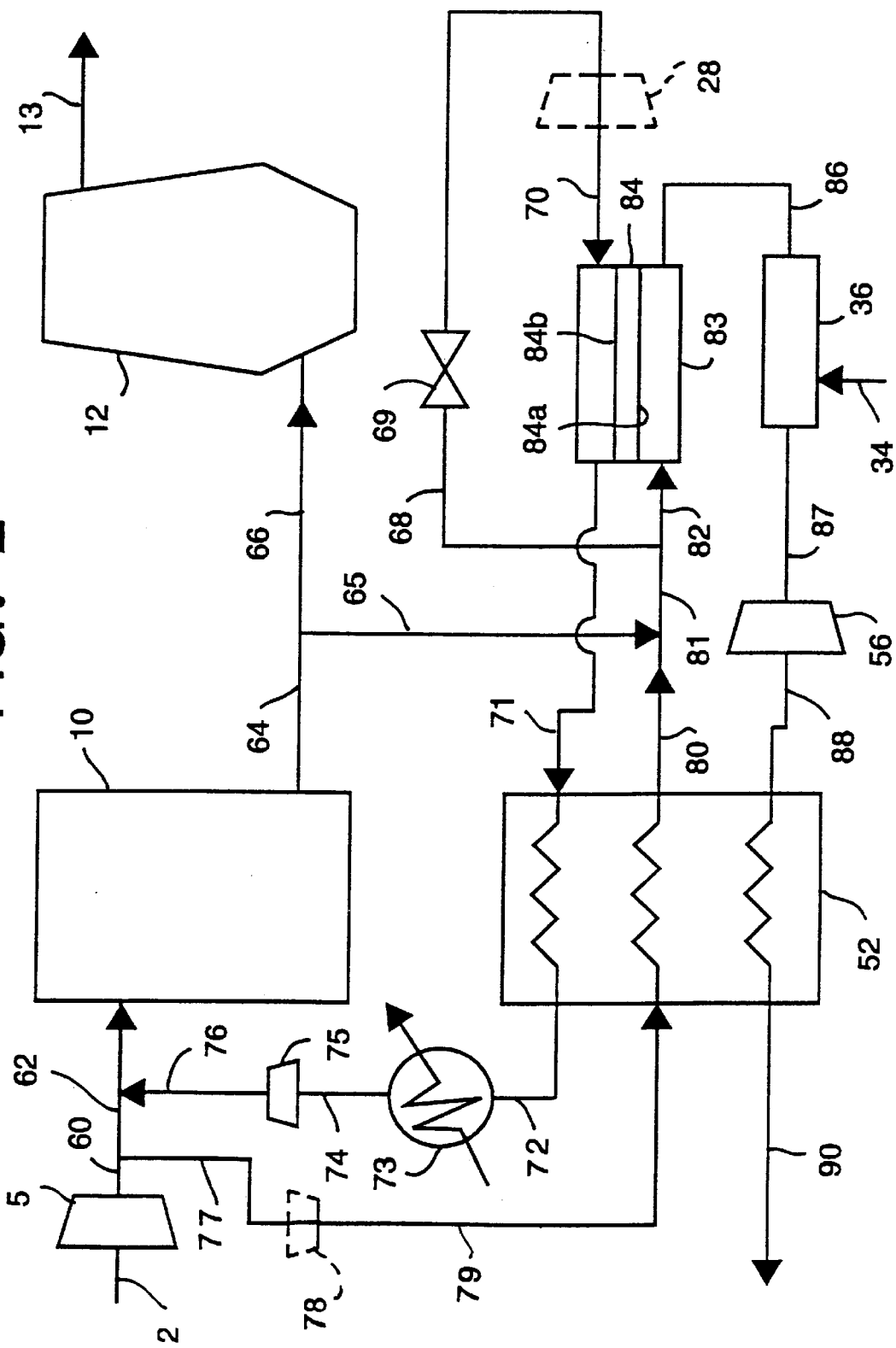
FIG. 2 is a schematic diagram of an embodiment of the invention similar to FIG. 1 except that the oxygen-rich gas stream from the ion transport module is cooled and compressed and injected into the pressurized gas stream entering the stoves and the hot blast air is blended with the feed gas stream to the ion transport module.

FIG. 2 is a schematic diagram showing a somewhat similar process to the previous one except in this case the oxygen-rich gas stream from the ion transport module is cooled and compressed and injected into the pressurized gas stream entering the stoves rather than being combined with the feed to the blast air blower. It can be seen that a portion of the blended feed gas stream is taken off for the purge gas stream. Since the feed gas stream and purge gas stream are both at the same temperature, the ion transport separation is isothermal. Isothermal operation is generally preferred for being more efficient and for reducing thermal stresses on the ion transport separator elements.

During operation, feed gas stream 2 is fed into blast air blower 5. Compressed feed gas stream 60 from blast air blower 5 is divided into gas stream 62 and into gas stream 77 which passes through optional booster compressor 78 to form gas stream 79 which passes through heat exchanger 52 where its temperature is raised by heat transfer with hot oxygen-enriched gas stream 71 and hot waste gas stream 87 from ion transport module 83 to form heated gas stream 80. Gas stream 62 is blended with oxygen-enriched gas stream 76 and fed into stoves 10. Gas stream 64 from stoves 10 is divided into gas stream 65, which is added to heated gas stream 80 to form gas stream 81, and gas stream 66, which is fed into blast furnace 12. Hot exhaust gas stream 13 leaves blast furnace 12. Gas stream 81 is divided into gas stream 82 and gas stream 68. Gas stream 82 is fed to the retentate side 84a of ion transport membrane 84. Gas stream 68 passes through valve 69 and through optional expander 28 where some of the compression energy is recovered and forms purge gas stream 70. Purge gas stream 70 is flowed on the permeate side 84b of ion transport membrane 84 in a direction counter-current to the flow on the retentate side 84a of ion transport membrane 84. By controlling the blending of gas stream 65 and gas stream 80, ion transport module 83 can be maintained at the proper operating temperature. Low pressure oxygen-enriched product gas stream 71 is cooled in heat exchanger 52 to form oxygen-enriched gas stream 72, which is cooled by cooler 73 to form gas stream 74. Gas stream 74 is compressed by compressor 75 to form gas stream 76 which is injected into gas stream 62 to increase the oxygen concentration of blast air stream 66. Nitrogen-rich waste gas stream 86, is passed through optional combuster 36 where fuel gas stream 34 is added and combustion takes place. Waste gas stream 87 passes through expander 56 where some of the compression energy is recovered to form gas stream 88. Gas stream 88 goes through heat exchanger 52 to form gas stream 90, which is generally discarded.

Figure 3:
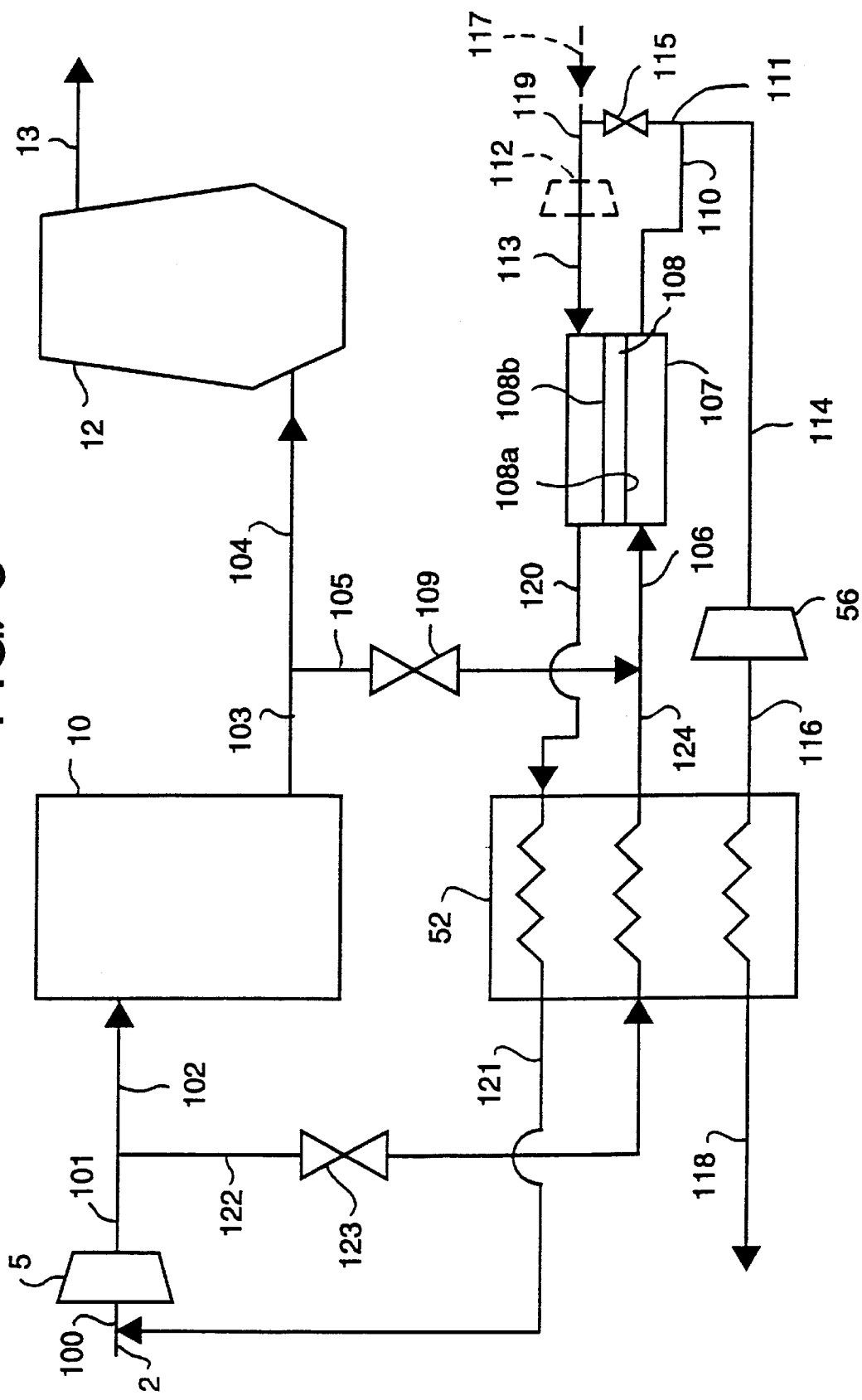
FIG. 3 is a schematic diagram of an embodiment of the invention showing a process wherein the purge gas stream is taken from a portion of the nitrogen co-product gas stream.

FIG. 3 is a schematic diagram showing a process wherein the purge gas stream is taken from a portion of the nitrogen waste gas stream. This configuration permits the taking of the waste gas stream as a nitrogen co-product if that is advantageous. In this case the hot blast air is added to the high pressure feed gas stream to the ion transport module, as in FIG. 2. Alternatively, the nitrogen-rich waste gas stream could be blended with the hot blast to form the purge gas stream somewhat lower than the pressure of the output of the blast air blower, the portion taken to feed the ion transport may have to be expanded through a valve, as shown, and the upper pressure of the ion transport process is thereby reduced to the pressure of the hot blast air. As in FIG. 1, a small quantity of fuel can be added to the purge gas stream and burned in the ion transport module as a means of supplemental heating. Alternatively, fuel can also be added to stream 106 and burned on the feed side of the ion transport module.

During operation, oxygen-enriched gas stream 121 is added to feed gas stream 2 to make gas stream 100 which is fed into blast air blower 5. Compressed feed gas stream 101 from blast air blower 5 is divided into gas stream 102 which is fed into stoves 10 and into gas stream 122 which passes through valve 123 and through heat exchanger 52 where its temperature is raised by heat transfer with hot oxygen-enriched gas stream 120 and hot waste gas stream 114 from ion transport module 107 to form heated gas stream 124. Gas stream 103 from stoves 10 is divided into gas stream 105, which passes through valve 109 and is added to gas stream 124 to make gas stream 106, and gas stream 104, which is fed into blast furnace 12. Hot exhaust gas stream 13 leaves blast furnace 12. Gas stream 106 is fed to the retentate side 108*a* of ion transport membrane 108. Retentate gas stream 110 is divided into gas stream which passes through valve 115 to form purge gas stream 119, and gas stream 114. Fuel gas stream 117, that is, a reactive gas subject to combustion with oxygen, is optionally added to purge gas stream 119 and eventually burned within ion transport module 107. Purge gas stream 119 goes through optional expander 112 where some of the compression energy is recovered and forms purge gas stream 113. Purge gas stream 113 is flowed on the permeate side 108*b* of ion transport membrane 108 in a direction counter-current to the flow on the retentate side 108*a* of ion transport membrane 108. By controlling the blending of gas stream 124 and gas stream 105, ion transport module 107 can be maintained at the proper operating temperature. Low pressure oxygen-enriched product gas stream 120 is cooled in heat exchanger 52 to form oxygen-enriched gas stream 121, which is injected into feed air stream 2 to increase the oxygen concentration of blast air stream 104. Nitrogen-rich waste gas stream 114 passes through expander 56 where some of the compression energy is recovered to form gas stream 116. Gas stream 116 goes through heat exchanger 52 to form gas stream 118, which is generally discarded.

Figure 4:
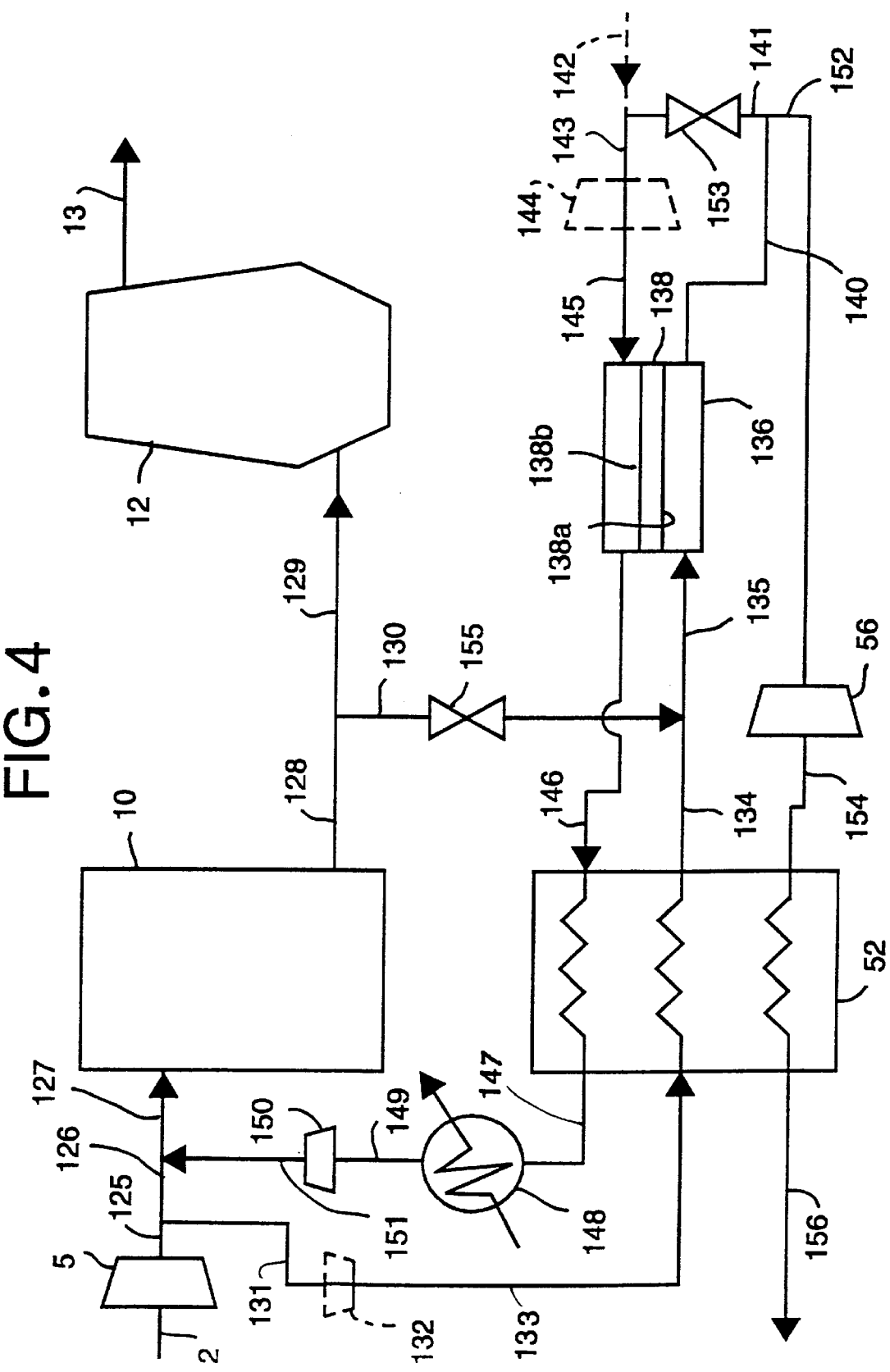
FIG. 4 is a schematic diagram of an embodiment of the invention similar to that of FIG. 3 except that the oxygen-rich permeate gas stream from the ion transport module is cooled and compressed and injected into the pressurized gas stream entering the stoves.

FIG. 4 is a schematic diagram showing a process that is similar to that of FIG. 3 except in this case the oxygen-rich gas stream from the ion transport module is cooled and compressed and injected into the pressurized gas stream entering the stoves rather than being recycled to the feed of the blast air blower.

During operation, feed gas stream 2 is fed into blast air blower 5 to form compressed gas stream 125. Compressed feed gas stream 125 from blast air blower 5 is divided into gas stream 126 and into gas stream 131 which passes through optional booster compressor 132 to form gas stream 133 which passes through heat exchanger 52 where its temperature is raised by heat transfer with hot oxygen-enriched gas stream 146 and hot waste gas stream 152 from ion transport module 136 to form heated gas stream 134. Gas stream 126 is blended with oxygen-enriched gas stream 151 to form gas stream 127 which is fed into stoves 10. Gas stream 128 from stoves 10 is divided into gas stream 130, which passes through valve 155 and is added to heated gas stream 134 to form gas stream 135, and gas stream 129, which is fed into blast furnace 12. Hot exhaust gas stream 13 leaves blast furnace 12. Gas stream 135 is fed to the retentate side 138*a* of ion transport membrane 138. Retentate gas stream 140 is divided into gas stream 141 and gas stream 152. Gas stream 141 passes through valve 153 to form gas stream 143 which in turn passes through optional expander 144 where some of the compression energy is recovered to form purge gas stream 145. Fuel gas stream 142, that is, a reactive gas subject to combustion with oxygen, is optionally added to purge gas stream 143 and eventually burned within ion transport module 136. Purge gas stream 145 is flowed on the permeate side 138*b* of ion transport membrane 138 in a direction counter-current to the flow on the retentate side 138*a* of ion transport membrane 138. By controlling the blending of gas stream 130 and gas stream 134, ion transport module 136 can be maintained at the proper operating temperature. Low pressure oxygen-enriched product gas stream 146 is cooled in heat exchanger 52 to form oxygen-enriched gas stream 147, which is cooled by cooler 148 to form gas stream 149. Gas stream 149 is compressed by compressor 150 to form gas stream 151 which is injected into gas stream 126 to increase the oxygen concentration of blast air stream 129. Nitrogen-rich waste gas stream 152 passes through expander 56 where some of the compression energy is recovered to form gas stream 154. Gas stream 154 goes through heat exchanger 52 to form gas stream 156, which is generally discarded.

Figure 5:
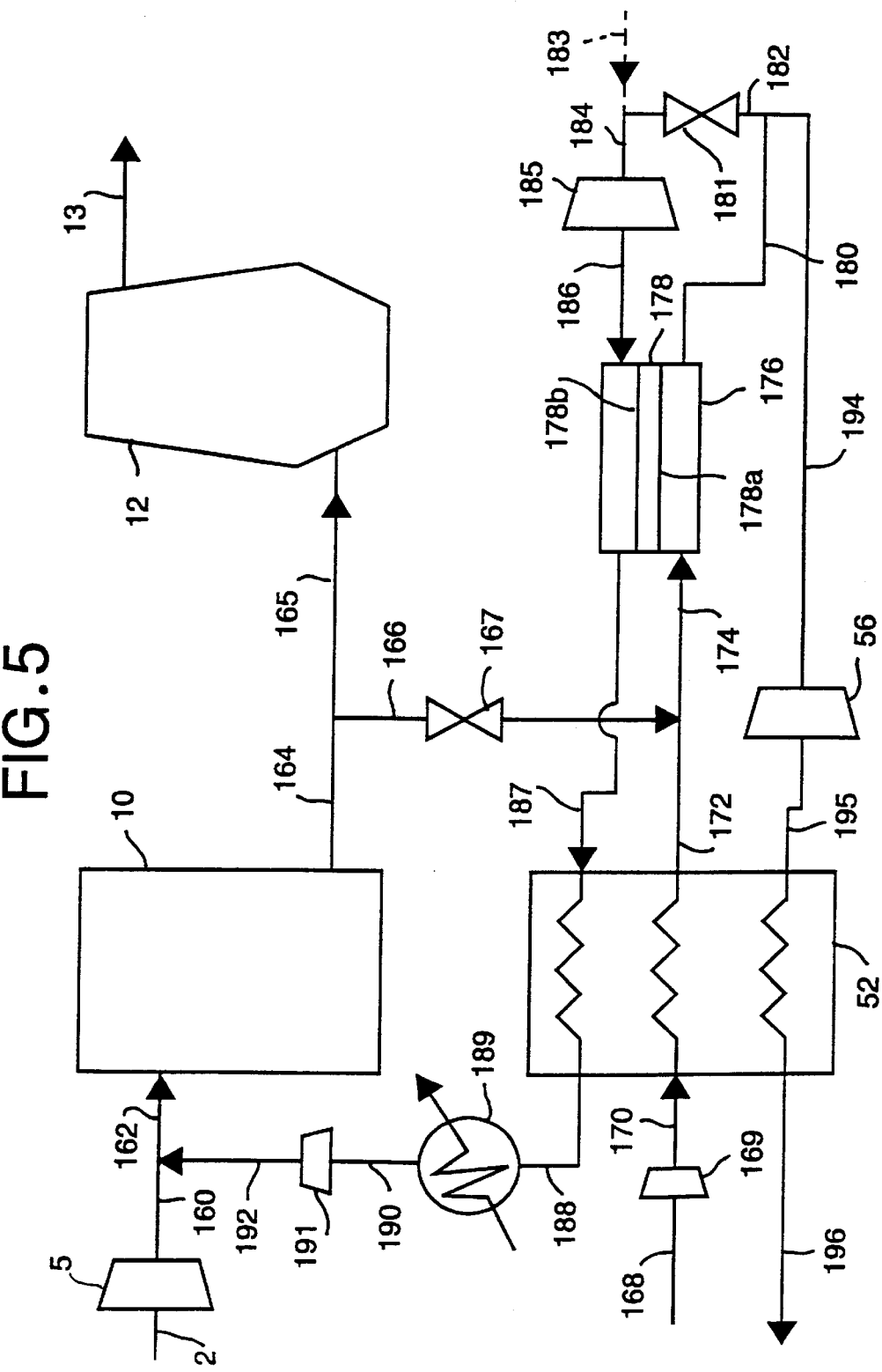
FIG. 5 is a schematic diagram of an embodiment of the invention similar to that of FIG. 4 wherein a separate air compressor pressurizes the ion transport module feed gas stream.

FIG. 5 is a schematic diagram showing a process where a separate air compressor is used to pressurize the ion transport module feed gas stream. This process could be used when it is impossible or impractical to obtain pressurized air from the blast air blower. This process is otherwise similar to that of FIG. 4.

During operation, feed gas stream 2 is fed into blast air blower 5 to form compressed gas stream 160. Gas stream 160 is blended with oxygen-enriched gas stream 192 to form gas stream 162 which is fed into stoves 10. Second feed gas stream 168 is passed through compressor 169 to form gas stream 170. Gas stream 170 passes through heat exchanger 52 where its temperature is raised by heat transfer with hot oxygen-enriched gas stream 187 and hot waste gas stream 194 from ion transport module 176 to form heated gas stream 172. Gas stream 164 from stoves 10 is divided into gas stream 166, which passes through valve 167 and is added to heated gas stream 172 to form gas stream 174, and gas stream 165, which is fed into blast furnace 12. Hot exhaust gas stream 13 leaves blast furnace 12. Gas stream 174 is fed to the retentate side 178a of ion transport membrane 178. Retentate gas stream 180 is divided into gas stream 182 and gas stream 195. Gas stream 182 passes through valve 181 to form gas stream 184 which in turn passes through expander 185 where some of the compression energy is recovered to form purge gas stream 186. Fuel gas stream 183, that is, a reactive gas subject to combustion with oxygen, is optionally added to purge gas stream 184 and eventually burned within ion transport module 176. Purge gas stream 186 is flowed on the permeate side 178b of ion transport membrane 178 in a direction counter-current to the flow on the retentate side 178a of ion transport membrane 178. By controlling the blending of gas stream 166 and gas stream 172, ion transport module 176 can be maintained at the proper operating temperature. Low pressure oxygen-enriched product gas stream 187 is cooled in heat exchanger 52 to form oxygen-enriched gas stream 188, which is cooled by cooler 189 to form gas stream 190. Gas stream 190 is compressed by compressor 191 to form gas stream 192 which is injected into gas stream 160 to increase the oxygen concentration of blast air stream 165. Nitrogen-rich waste gas stream 194 passes through expander 56 where some of the compression energy is recovered to form gas stream 195. Gas stream 195 goes through heat exchanger 52 to form gas stream 196, which is generally discarded.

It should be noted that the ion transport processes depicted in FIGS. 1, 2, 3, 4 and 5 produce oxygen-enriched air rather than pure oxygen. This is an advantage since it is difficult to handle pure oxygen safely, particularly at elevated pressure and temperature, and the ion transport process is inherently a high temperature process. The ion transport process has an infinite separation factor for oxygen but, for applications that require oxygen-enriched air rather than pure oxygen, it is more efficient to purge the permeate side of the ion transport membrane and reduce the oxygen partial pressure than to produce pure oxygen and subsequently dilute it.

In order to quantitatively describe the relative advantages and efficiencies of the alternative processes depicted in FIGS. 1, 2, 3, and 4, Examples are provided below.

EXAMPLES

Some of the preferred modes of operating the invention can be further illustrated by means of examples wherein the flow rates, compositions and temperatures of the process streams are balanced for hypothetical operating conditions, using models that have been developed for the ion transport module.

For all of these examples which follow, the operation specifications are:

TABLE I

| Enriched Blast Composition | 26 | % $O_2$ |
| Hot Blast Flowrate | 100,000 | scfm |
| Hot Blast Temperature | 2200 | °F. |
|  | 1204 | °C. |
| Blast Air Blower Discharge Pressure | 60 | psia |
| Ion Transport Module Operating Temperature | 800 | °C. |
|  | 1472 | °F. |
| Ion Transport Membrane Ionic Conductivity | 1.1 | S/cm |
| Ion Transport Membrane Thickness | 25 | microns |

EXAMPLE 1

This example is the process depicted in FIG. 1, wherein the purge gas stream is made by blending some of the depressurized hot blast air with some of the depressurized ion transport module feed gas stream. By assuming a retentate gas stream containing 10% oxygen and a purge to retentate ratio of 25%, the following operating parameters are obtained, as shown in Table E-1. No added fuel was used in this example.

TABLE E-1 (see FIG. 1)

| Gas Stream | % $O_2$ | P (psia) | T (°F.) | F (scfm) |
| --- | --- | --- | --- | --- |
| Air Feed | 21 | 15 |  | 146,600 |
| Recycles Enriched Air | 60.3 | 15 |  |  |
| Blast Blower Discharge | 26 | 60 |  | 168,430 |
| Take-Off to Ion Transport Module Feed (ITM) | 26 | 60 |  | 60,250 |
| Hot Blast from Stoves | 26 | 50 | 2,200 | 108,250 |
| Hot Blast to ITM Feed | 26 | 15 | 2,200 | 8,250 |
| Total Purge | 26 | 15 | 1,370 | 11,700 |
| Retentate | 10 | 60 | 1,370 | 46,700 |
| Waste | 10 | 15 | 300 | 46,700 |

In Example 1, 68% of the oxygen contained in the ion transport module feed gas stream is recovered in the permeate gas stream at an oxygen concentration of 60%. The ion transport membrane area required for the separation is 17,810 $ft^2$. The blast air blower is required to compress approximately 168,000 scfm to produce 100,000 scfm of oxygen-enriched air (26% oxygen) to the blast furnace. The retentate gas stream of 47,700 scfm can be expanded through a turbine to recover some of the compression energy required by the blast air blower. Assuming an adiabatic efficiency of 85% for the blower and the turbine, the computed powers are:

Added power required for the blower: 6706 kW

Power recovered by the turbine: 4397 kW

Net added power: 2309 kW

In this example, the compression energy lost in the depressurization of the gas streams taken for the ion transport membrane purge is not recovered. The power could be decreased by passing the gas to be used as a purge through an optional expander, as shown in FIG. 1.

EXAMPLE 2

It is assumed in Example 1 that the blast air blower has the capacity to handle the additional flow of the ion transport module gas stream and can safely tolerate the increased oxygen concentration. These questions are avoided in Example 2 which is the process depicted in FIG. 2. Here the oxygen-enriched product from the ion transport stage is compressed in a separate compressor, rather than in the blast air blower as in Example 1. Once again the temperature of the ion transport module is maintained by taking some of the hot blast air but, in this example, it is blended into the ion transport module feed gas stream and a portion of the resultant gas stream is expanded and used for the counter-current purge. Again assuming a retentate gas stream containing 10% oxygen and a purge to retentate ratio of 25%, the following operating parameters are obtained, as shown in Table E-2. No added fuel was used in this example.

TABLE E-2 (see FIG. 2)

| Gas Stream | % $O_2$ | P (psia) | T (°F.) | F (scfm) |
|---|---|---|---|---|
| Air Feed | 21 | 15 | | 146,800 |
| Ion Transport Module Enriched Air | 50.5 | 15 | | 18,583 |
| Blast Blower Discharge | 26 | 60 | | 146,800 |
| Take-Off to Ion Transport Module Feed | 26 | 60 | | 57,600 |
| Hot Blast from Stoves | 26 | 50 | 2,200 | 107,851 |
| Hot Blast to Ion Transport Module Feed | 26 | 15 | 2,200 | 7,850 |
| Purge | 26 | 15 | 1,870 | 11,700 |
| Retentate | 10 | 60 | 1,470 | 46,850 |
| Waste | 1o | 15 | 310 | 46,850 |

In Example 2, 59% of the oxygen contained in the ion transport module feed gas stream is recovered in the permeate gas stream at an oxygen concentration of 50.5%. The ion transport membrane area required for the separation is 10,300 ft². The blast air blower is required to compress approximately 146,850 scfm to produce 100,000 scfm of oxygen-enriched air (26% oxygen) to the blast furnace. Once again the retentate gas stream of 46,800 scfm can be expanded through a turbine to recover some of the compression energy required by the blast air blower. Assuming an adiabatic efficiency of 85% for the blower and the turbine, the computed powers are:

Added power required for the blower: 4590 kW

Power for ion transport product compressor: 1821 kW

Power recovered by the turbine: 4783 kW

Net added power: 1629 kW

As in Example 1, some additional power could be recovered by passing the gas to be used as a purge through an optional expander, as shown in FIG. 2.

The calculations show that this embodiment requires less ion transport membrane area and consumes less power than Example 1, but the process in Example 2 requires an additional compressor and chiller. The membrane area could be reduced further by compressing the ion transport module feed gas stream to a higher pressure in the (optional) compressor shown in FIG. 2.

EXAMPLE 3

This example is the process depicted in FIG. 3, wherein the purge gas stream is taken from the nitrogen-rich retentate gas stream. As in Example 1, the oxygen-rich permeate is recycled to the feed gas stream to the blast air blower. By assuming a retentate gas stream containing 5% oxygen and a purge to retentate ratio of 20%, the following operating parameters are obtained, as shown in Table E-3.

TABLE E-3 (see FIG. 3)

| Gas Stream | % $O_2$ | P (psia) | T (°F.) | F (scfm) |
|---|---|---|---|---|
| Air Feed | 21 | 15 | | 132,010 |
| Recycled Enriched Air | 60.7 | 15 | | 19,400 |
| Blast Blower Discharge | 21 | 60 | | 151,410 |
| Take-Off to Ion Transport Module Feed | 26 | 60 | | 40,360 |
| Hot Blast from Stoves | 26 | 60 | 2,200 | 111,060 |
| Hot Blast to Ion Transport Module Feed | 26 | 60 | 2,200 | 11,060 |
| Ion Transport Module Feed | 26 | 60 | 1,470 | 51,420 |
| Retentate Purge | 5 | 15 | 1,470 | 8,010 |
| Retentate Waste | 5 | 60 | 1,470 | 32,010 |
| Discharged Waste | 5 | 15 | 360 | 32,010 |

In Example 3, the pressure drop across the stoves has been neglected. The oxygen concentration of the permeate gas stream is 60%; and 85% of the oxygen contained in the ion transport module feed gas stream is recovered. The ion transport membrane area required for the separation is 19,600 ft². The blast air blower is required to compress approximately 151,000 scfm to produce 100,000 scfm of oxygen-enriched air (26% oxygen) to the blast furnace, but the waste gas stream of 32,010 scfm can be expanded to recover some of the compression energy. Assuming an adiabatic efficiency of 85% for the blower and the turbine, the computed powers are:

Added power required for the blower: 5039 kW

Power recovered by the turbine: 3511 kW

Net added power: 1528 kW

In this case, compression energy is lost in the depressurization of the portion of the retentate gas stream that is taken from the ion transport purge gas stream. Some of this energy could be recovered by passing this gas stream through an expander rather than a valve.

EXAMPLE 4

In this example (FIG. 4), part of the retentate is used as the ion transport purge gas stream, as in Example 3, but the oxygen-rich permeate is separately compressed and reinjected into the feed to the stoves, as in Example 2, rather than being recycled through the blast air blower. Again assuming a retentate gas stream containing 5% oxygen and a purge to retentate ratio of 20%, the following operating parameters are obtained, as shown in Table E-4.

TABLE E-4 (see FIG. 4)

| Gas Stream | % $O_2$ | P (psia) | T (°F.) | F (scfm) |
|---|---|---|---|---|
| Air Feed | 21 | 15 | | 132,010 |
| Ion Transport Module Enriched Air | 53.7 | 15 | | 16,450 |
| Blast Blower Discharge | 21 | 60 | | 132,090 |
| Take-Off to Ion Transport Module Feed | 21 | 60 | | 42,710 |
| Hot Blast from Stoves | 26 | 60 | 2,200 | 105,830 |
| Hot Blast to Ion Transport Module Feed | 26 | 60 | 2,200 | 5,830 |
| Ion Transport Module Feed | 22 | 60 | 1,470 | 48,540 |
| Retentate Purge | 5 | 15 | 1,470 | 8,010 |
| Retentate Waste | 5 | 60 | 1,470 | 32,090 |
| Waste | 5 | 15 | 310 | 32,090 |

In this example the oxygen concentration of the permeate gas stream is 53.7% and 81% of the oxygen contained in the ion transport module feed gas stream is recovered. The ion transport membrane area required for the separation is 14,400 ft². The blast air blower is required to compress approximately 132,090 scfm to produce 100,000 scfm of oxygen-enriched air (26% oxygen) to the blast furnace, but the waste gas stream of 32,010 scfm can be expanded to recover some of the compression energy. Assuming an adiabatic efficiency of 85% for the blower and the turbine, the computed powers are:

Added power required for the blower: 3144 kW

Power for ion transport module compressor: 1613 kW

Power recovered by the turbine: 3276 kW

Net added power: 1481 kW

Once again, compression energy is lost in the depressurization of the portion of the retentate gas stream that is taken for the ion transport membrane purge. Some of this energy could be recovered by passing this purge gas stream through an expander rather than a valve.

Comparing the results from these examples, both the net powers and the ion transport membrane areas are lower for the processes (Examples 2 and 4) where the oxygen-enriched permeate from the ion transport module is separately compressed and injected into the feed gas stream to the stoves, rather than being recycled to the feed of the blast air blower (Examples 1 and 3). These processes, however, require additional compression equipment and a chiller. Where the existing blast air blower has excess capacity, the processes of Examples 2 and 4 may be advantageously used, otherwise the processes of Examples 1 and 3 may be preferred. No attempt has been made to optimize the operating parameters, which depend on comparative costs and other economic factors. These are but a few examples of many that could be developed.

All of these processes are novel in that they utilize purge gas streams taken from the ion transport module feed gas stream or the retentate gas stream. This is unusual in gas separation technology because the oxygen-rich permeate is deliberately diluted by the purge. These methods succeed and are highly efficient because only a modest oxygen enrichment is required and the dilution of the permeate enhances the driving force for oxygen permeation.

These Examples also show that the use of the retentate for purging (Examples 3 and 4) lowers the power requirement but increases the required membrane area, compared to the use of the feed gas stream for purging (Examples 1 and 2). Ultimately, the preferred process will depend on economic considerations. Where there is a need for a nitrogen co-product, the processes of Examples 3 and 4 are advantageous, and Example 4 represents the preferred process. Although the retentate gas stream in Examples 3 and 4 contains 5% oxygen, the processes can be altered to achieve a recovery of nearly 100% oxygen and produce nearly pure nitrogen in the retentate gas stream. When pure nitrogen is desired, it may be advantageous to use an electrically-driven or pressure-driven second ion transport stage to refine the waste gas stream by removing traces of oxygen from the final pure nitrogen product.

All of these Examples are to be considered as preferred embodiments of the invention.

As has been mentioned, the preferred modes of operation of the invention incorporate pressure-driven ion transport process wherein the permeate side of the ion transport membrane is purged. Examples of these processes have been described and are illustrated in FIGS. 1, 2, 3 and 4.

If it is not practical to use a purge gas stream, however, it is still possible to extract oxygen from air by the ion transport process. The low pressure product is pure oxygen, however, and this requires that the feed gas stream be at a relatively high pressure in order to drive the oxygen transport process.

Figure 6:
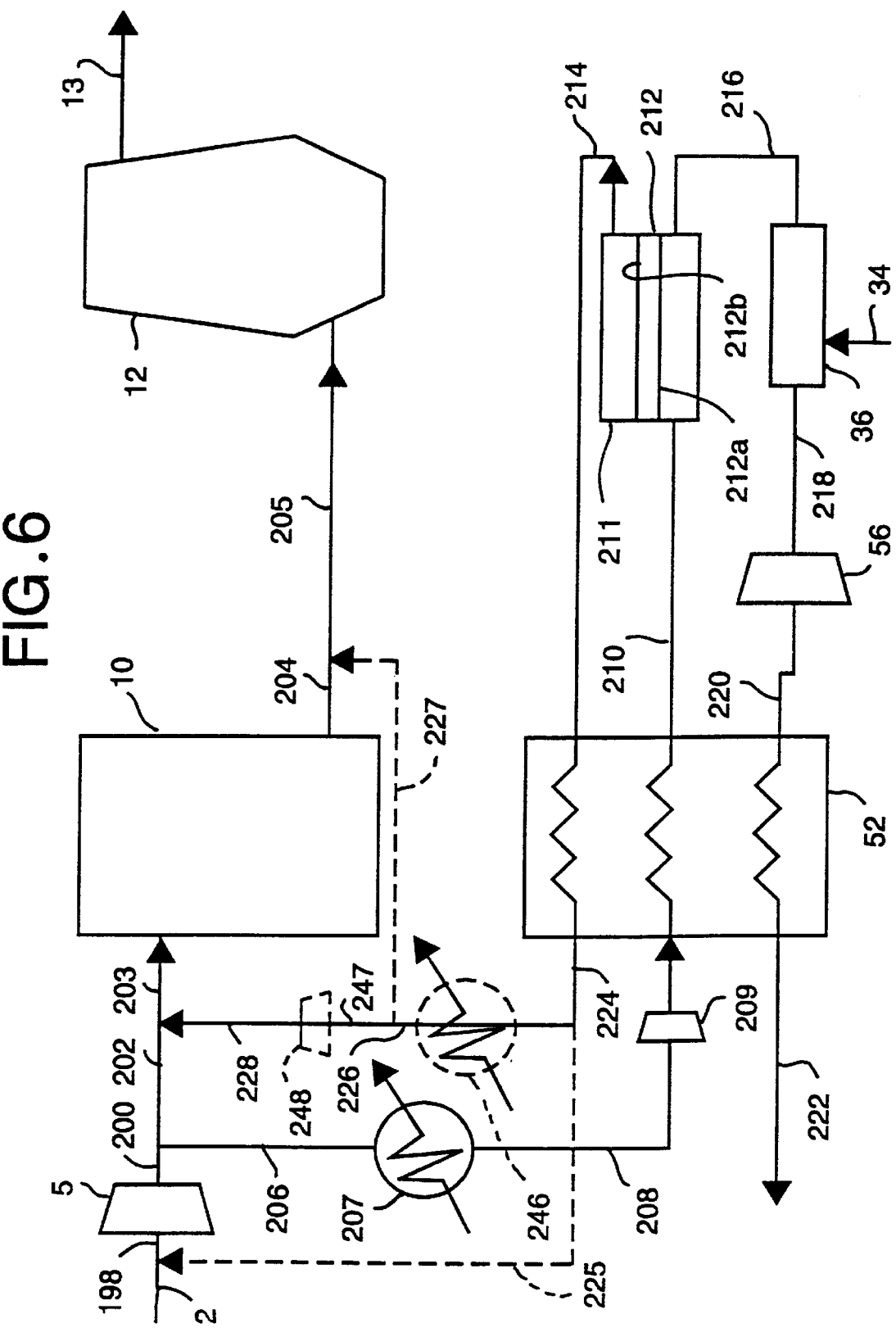
FIG. 6 is a schematic diagram of an embodiment of the invention having a pressure-driven ion transport process where a portion of the air from the blast air blower is cooled and compressed in a booster compressor to a high pressure to pass through a heat exchanger and through a combustor to raise the feed gas stream temperature to the preferred ion transport operating temperature.

An example of such a pressure-driven process is shown in FIG. 6. In FIG. 6, the oxygen product is injected into the air feed stream to the stoves.

Alternatively, the oxygen could be injected into the hot blast air from the stoves, as shown by the optional path. The processes depicted in these schemes require that the ion transport module operate at high pressure in order to produce oxygen-enriched air at 50–60 psia.

During operation, gas stream 225 is optionally added to feed gas stream 2 to form gas stream 198 which is fed into blast air blower 5. Compressed feed gas stream 200 from blast air blower 5 is divided into gas stream 202 and into gas stream 206 which passes through cooler 207 to form gas stream 208 which passes through compressor 209 and heat exchanger 52 where its temperature is raised by heat transfer with hot oxygen-enriched gas stream 214 and hot waste gas stream 218 from ion transport module 211 to form heated gas stream 210. Gas stream 202 is blended with oxygen-enriched gas stream 228 to form gas stream 203 which is fed into stoves 10. Gas stream 227 may optionally be added to gas stream 204 to form gas stream 205 which is fed into blast furnace 12. Hot exhaust gas stream 13 leaves blast furnace 12. Gas stream 210 is fed to the retentate side 212a of ion transport membrane 212 and oxygen emerges from permeate side 212b. Gas stream 214 emerging from ion transport module 211 is cooled in heat exchanger 52 to form oxygen-enriched gas stream 224. Optionally, at least a portion of oxygen-enriched gas stream 224 is added as gas stream 225 to feed gas stream 2. Gas stream 224 is cooled in optional cooler 246 to form gas stream 226. Optionally, at least a portion of oxygen-enriched gas stream 226 is added as gas stream 227 to gas stream 204; gas stream 247 is passed through optional booster compressor 248 to obtain gas stream 228. Gas stream 228 is injected into gas stream 202 to increase the oxygen concentration of blast air stream 205. Nitrogen-rich waste gas stream 216, is passed through combuster 36 where fuel gas stream 34 is added and combustion takes place. This allows the temperature of waste gas stream 216 to be increased by adding a small quantity of fuel. Alternatively, the combustor could be placed in the feed stream to ion transport module 211, but this lowers the oxygen partial pressure before the separation and decreases the efficiency of the ion transport stage. Waste gas stream 218 passes through expander 56 where some of the compression energy is recovered to form gas stream 220. Gas stream 220 goes through heat exchanger 52 to form gas stream 222, which is generally discarded.

The optional equipment in FIG. 6 shows how the pressure difference driving the ion transport process is obtained by pumping the oxygen product gas stream, rather than compressing the feed gas stream. It is obvious that the process could be combined and compressors (pumps) could be used in both the feed gas streams and product gas streams simultaneously. Such modifications of the examples provided herein, as well as others, are well within the skill of those of ordinary skill in the art.

Materials useful for the ion transport membrane are shown in Table II.

TABLE II

Material composition

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. 60.3
3. $BaFe_{0.5}Co_{0.5}YO_3$
   $SrCeO_3$
   $YBa_2Cu_3O_{7-6}$ ($0 \leq \beta \leq 1$, $\beta$ from stoichimetry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ ($x,x',x'',y,y',y''$ all in 0–1 range)
   where: A,A',A" = from groups 1, 2, 3 and f-block lanthanides
   B,B',B" = from d-block transition metals
6. (a) Co—La—Bi type:  Cobalt oxide  15–75 mole %
   Lanthanum oxide  13–45 mole %
   Bismuth oxide  17–50 mole %
   (b) Co—Sr—Ce type:  Cobalt oxide  15–40 mole %
   Strontium oxide  40–55 mole %
   Cerium oxide  15–40 mole %
   (c) Co—Sr—Bi type:  Cobalt oxide  10–40 mole %
   Strontium oxide  5–50 mole %
   Bismuth oxide  35–70 mole %
   (d) Co—La—Ce type:  Cobalt oxide  10–40 mole %
   Lanthanum oxide  10–40 mole %
   Cerium oxide  30–70 mole %
   (e) Co—La—Sr—Bi type:  Cobalt oxide  15–70 mole %
   Lanthanum oxide  1–40 mole %
   Strontium oxide  1–40 mole %
   Bismuth oxide  25–50 mole %

TABLE II-continued

Material composition

| | | |
|---|---|---|
| (f) Co—La—Sr—Ce type: | Cobalt oxide | 10–40 mole % |
| | Lanthanum oxide | 1–35 mole % |
| | Strontium oxide | 1–35 mole % |
| | Cerium oxide | 30–70 mole % |

7. $Bi_{2-x-y}M'_xM_yO_{3-\delta}$ ($0 \le x \le 1$, $0 \le y \le 1$, $\delta$ from stoichimetry) where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where,
   x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B"
   in the formula; and $0.9 < (s+t)/(u+v+w) < 1.1$
10. One of the materials $La_{1-x}Sr_xCu_{1-y}M_yO_{3-\delta}$ family, where:
    M represents Fe or Co;
    x equals from zero to about 1;
    y equals from zero to about 1;
    $\delta$ equals a number that satisfies the valences of La, Sr, Cu, and M in the formula.
11. One of the materials of $Ce_{1-x}A_xO_{2-\delta}$ family, where:
    A represents a lanthanide, Ru, or Y; or a mixture thereof;
    x equals from zero to about 1;
    y equals from zero to about 1;
    $\delta$ equals a number that satisfies the valences of Ce and A in the formula.
12. One of the materials of $Sr_{1-x}Bi_xFeO_{3-\delta}$ family, where:
    A represents a lanthanide or Y, or a mixture thereof;
    x equals from zero to about 1;
    y equals from zero to about 1;
    6 equals a number that satisfies the valences of Ce and A in the formula.
13. One of the materials of $Sr_xFe_yCo_zO_w$ family, where:
    x equals from zero to about 1;
    y equals from zero to about 1;
    z equals from zero to about 1;
    w equals a number that satisfies the valences of Sr, Fe and Co in the formula.
14. Dual phase mixed conductors (electronic/ionic):
    $(Pd)_{0.5}/(YSZ)_{0.5}$
    $(Pt)_{0.5}/(YSZ)_{0.5}$
    $(B\text{-}MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added.

Figure 7:
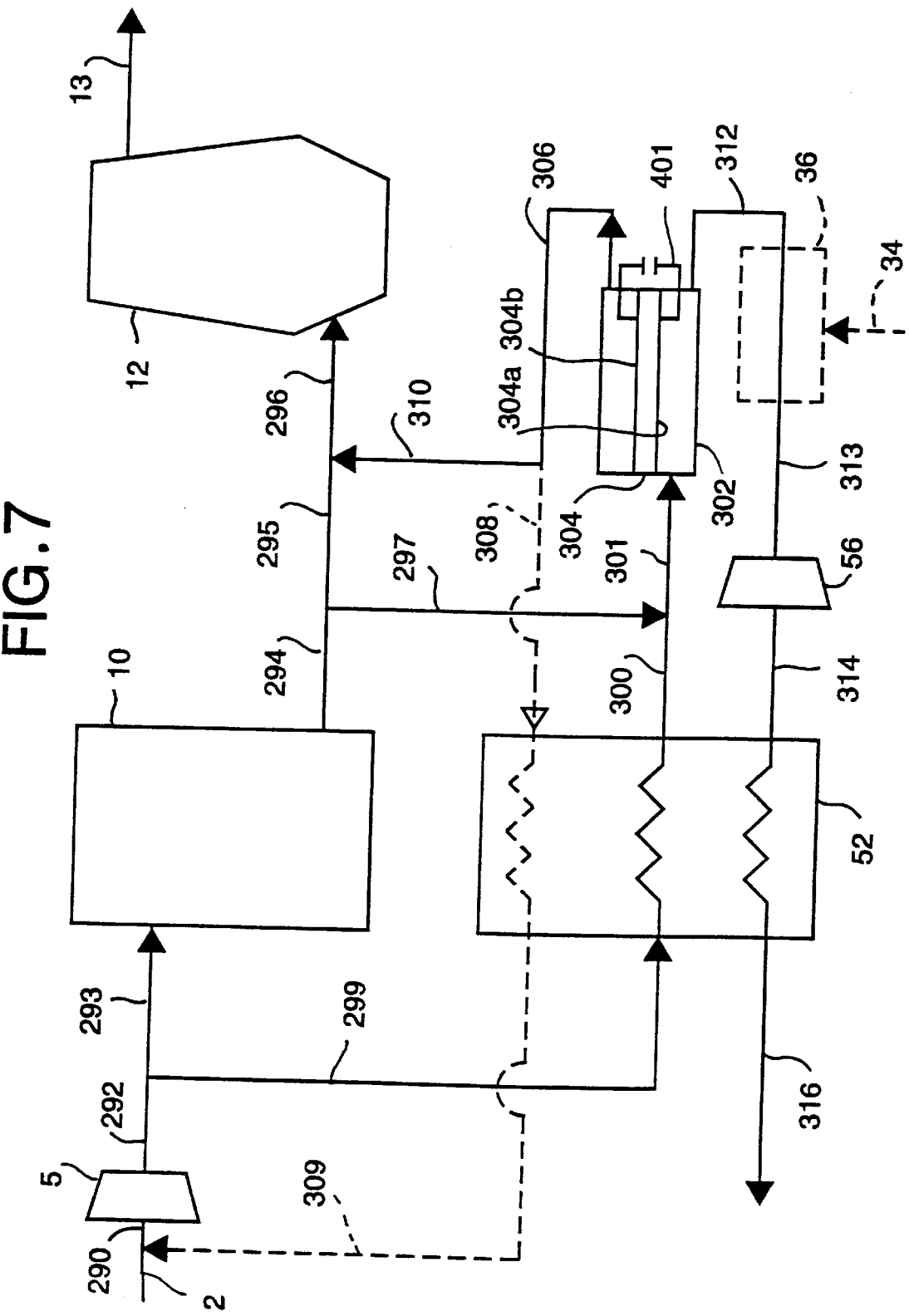
FIG. 7 is a schematic diagram of an embodiment of the invention showing an electrically-driven ion transport module combined with a blast furnace operation wherein the permeate gas stream is added directly to the heated gas stream that is injected into the blast furnace.

Although the processes as described above require the use of solid mixed conductors as the membrane in the ion transport module, it is also possible, in principle, to employ purely ionic conductors in an electrically-driven mode. An electrically-driven ion transport membrane not only produces pure oxygen but permits the pure oxygen gas stream to be compressed to a suitably high pressure by applying a sufficient voltage. Alternatively, the oxygen can be produced at a lower pressure, thereby reducing the required voltage. The modifications required to convert a pressure-driven process to an electrically-driven process would be obvious to those of skill in the art. For example, FIG. 7 is a schematic diagram of an embodiment of the invention showing an electrically-driven ion transport module combined with a blast furnace operation wherein the permeate gas stream is added directly to the heated gas stream that is injected into the blast furnace. During operation, feed gas stream 2 is fed into blast air blower 5. Compressed feed gas stream 292 from blast air blower 5 is divided into gas stream 299 and into gas stream 293. Oxygen gas stream 309 is optionally added to gas stream 293 to form gas stream 290. Gas stream 299 is passed through heat exchanger 52 where its temperature is raised by heat transfer with hot waste gas stream 313 and, optionally, with hot oxygen-enriched gas stream 308 and from ion transport module 302 to form heated gas stream 300. Gas stream 290 is fed into stoves 10 and emerges as heated feed gas stream 294 which is divided into gas stream 297 and gas stream 295. Gas stream 297 is added to gas stream 300 to obtain gas stream 301. Gas stream 301 is fed to the retentate side 304a of ion transport membrane 304. Electrodes on retentate side 304a and permeate side 304b are energized by power source 401. Oxygen gas stream 306 emerging from ion transport module 302 either becomes oxygen gas stream 308 (shown in phantom) or oxygen gas stream 310. Oxygen gas stream 308, if made, is cooled in heat exchanger 52 to form oxygen gas stream 309 which is added to gas stream 293, as mentioned above. Oxygen gas stream 310, if made, is blended with hot gas stream 295 to form oxygen-enriched gas stream 296 which is fed into blast furnace 12. Hot exhaust gas stream 13 leaves blast furnace 12. Nitrogen-rich waste gas stream 312 is passed through optional combuster 36 where fuel gas stream 34 is added and combustion takes place to form gas stream 313. This allows the temperature of waste gas stream 312 to be increased by adding a small quantity of fuel. Alternatively, the combustor could be placed in the feed gas stream to ion transport module 302, but this lowers the oxygen partial pressure before the separation and decreases the efficiency of the ion transport stage. Waste gas stream 313 passes through expander 56 where some of the compression energy is recovered to form gas stream 314. Gas stream 314 goes through heat exchanger 52 to form gas stream 316, which is generally discarded.

Figure 8:
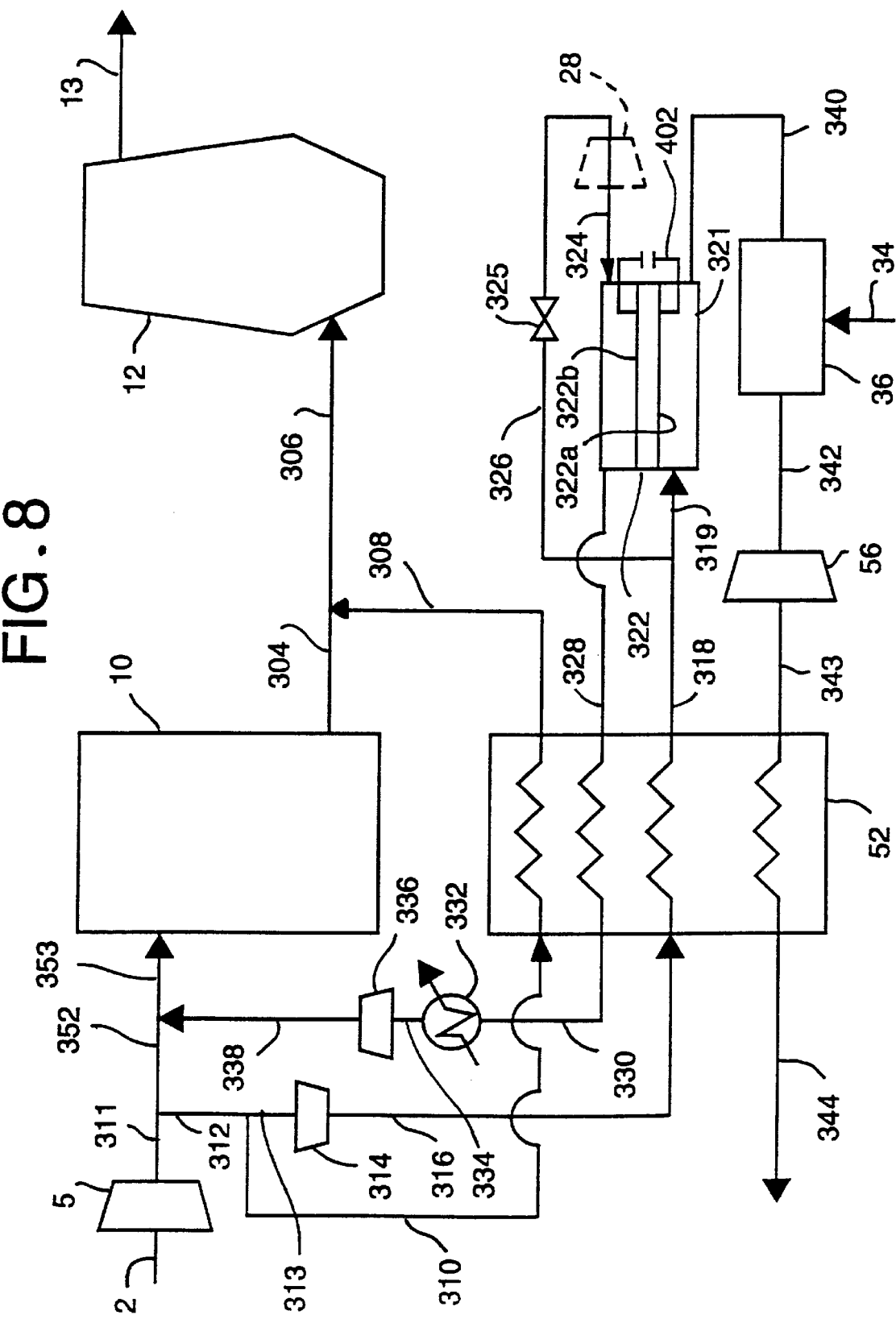
FIG. 8 is a schematic diagram of an embodiment of the invention showing an ion transport module combined with a blast furnace operation wherein a portion of the air from the blast air blower is diverted to the ion transport process.

FIG. 8 is a schematic diagram of an embodiment of the invention showing an ion transport module combined with a blast furnace operation wherein a portion of the air from the blast air blower is diverted to the ion transport process. During operation, feed gas stream 2 is fed into blast air blower 5 to form compressed feed gas stream 311 which is divided into gas stream 312 and into gas stream 352. Gas stream 312 is divided into gas stream 310 and gas stream 313 which passes through compressor 314 to form gas stream 316. Gas stream 316 and gas stream 310 are each passed through heat exchanger 52 where their temperatures are raised by heat transfer with hot oxygen-enriched gas stream 328 and hot waste gas stream 342 from ion transport module 321 to form heated gas stream 318 and heated gas stream 308, respectively. Gas stream 352 is blended with oxygen-enriched gas stream 338 to form gas stream 353 which is fed into stoves 10. Gas stream 304 emerging from stoves 10 is blended with gas stream 308 to form gas stream 306 which is fed into blast furnace 12. Hot exhaust gas stream 13 leaves blast furnace 12. Gas stream 318 is divided into gas stream 319 and gas stream 326. Gas stream 319 is fed to the retentate side 322a of ion transport membrane 322. Electrodes on retentate side 322a and permeate side 322b are energized by power source 402. Gas stream 326 passes through valve 325 and, optionally, power expander 28 to form gas stream 324. Gas stream 324 is used to purge the permeate side 322b of ion transport membrane 322. Gas stream 328 emerging from ion transport module 321 is cooled in heat exchanger 52 to form oxygen-enriched gas stream 330. Oxygen-enriched gas stream 330 is cooled in cooler 332 to form gas stream 334. Gas stream 334 is passed through booster compressor 336 to obtain gas stream 338 which, as mentioned above, is blended with gas stream 352 to increase the oxygen concentration of blast air stream 306. Nitrogen-rich waste gas stream 340, is passed through optional combuster 36 where fuel gas stream 34 is added and combustion takes place. This allows the temperature of waste gas stream 340 to be increased by adding a small quantity of fuel. Waste gas stream 342 passes through expander 56 where some of the compression energy is recovered to form gas stream 343. Gas stream 343 goes through heat exchanger 52 to form gas stream 344, which is generally discarded.

The power recovered from the waste gas stream by means of an expander or turbine can be used to partially offset the requirements for feed air compression and, as shown above, the power can be substantial. It should be noted that if a power-producing turbine is employed for recovering energy from the expansion of the nitrogen-rich waste stream, the turbine should be located in a higher temperature region than most of the figures indicate. The ideal turbine inlet temperature could be around 1300° F., which would permit use of reasonably inexpensive gas expanders.

These schemes depicted in the figures could be enhanced further and the energy efficiency of the overall process improved. For example, the electrically-driven processes depicted in FIGS. 7 and 8 could be operated with a permeate side purge, using a gas with a low oxygen partial pressure, in order to reduce the Nernst potential and the required electrical power. It should also be noted that, although the schemes of FIGS. 7 and 8 appear simple, the electrically-driven processes are more complex to design and manufacture than the pressure-driven processes. The electrical processes also have the disadvantage of consuming large amounts of electrical power. Therefore, for the purpose of this invention, the pressure-driven processes are preferred. It should also be apparent that the control of the temperature depends on the temperature at the warm end of the heat exchanger. In certain circumstances, it may be possible to operate these processes without the heat exchanger, the proper feed temperature for the ion transport module being obtained simply by appropriate blending of air from the blast air blower with hot blast air. It should also be pointed out that an ion transport module can be used as the combustor in any of the Figures.

Reactive purge arrangements are disclosed in "Reactive Purge for Solid Electrolyte Membrane Gas Separation", U.S. Ser. No. 08/567,699, filed Dec. 5, 1995 and incorporated herein by reference. Preferred configurations for ion transport modules utilizing a reactive purge are disclosed in "Solid Electrolyte Ionic Conductor Reactor Design", U.S. Ser. No. 08/848,204 [Attorney Docket No. D-20352], filed Apr. 29, 1997 and also incorporated herein by reference. Both applications are commonly owned with the present application.

As mentioned above, the terms "solid electrolyte ionic conductor", "solid electrolyte ion transport membrane", "solid electrolyte" or "ion transport membrane" are generally used herein to designate either an ionic-type (electrically-driven) system or a mixed conductor-type (pressure-driven) system unless otherwise specified.

The term "nitrogen" as used herein usually means oxygen-depleted gas, that is, oxygen-depleted relative to the feed gas. As discussed above, the ion transport membrane only allows oxygen permeation. Therefore, the composition of the retentate will depend on the composition of the feed gas. The retentate gas will be depleted of oxygen but will retain nitrogen and any other gases (for example, argon) present in the feed gas. The meaning of the term will be clear to one of skill in the art in the context of the use of the term in light of the invention as disclosed herein.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

The term "high purity" refers to a product gas stream which contains less than five percent by volume of undesired gases. Preferably the product is at least 99.0% pure, more preferably 99.9% pure, and most preferably at least 99.99% pure, where "pure" indicates an absence of undesired gases.

Many alternative variations of physical elements such as inter-system and inter-stage heat exchangers, inter-coolers, heaters, and other equipment that are required in the practice of the invention may be used in any appropriate fashion in this invention. The use of these elements, for example, the heat exchangers described herein, often enhances the energy efficiency of the overall process. Such components and their operation are well known in the art and in the practice of gas separation and gas processing and their appropriate use in the present invention would be understood to those of skill in the art.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for oxygen-enriching a first feed gas stream containing elemental oxygen and at least one other gas to be fed into a furnace by utilizing a pure oxygen gas stream or an oxygen-enriched gas stream obtained from a second feed gas stream containing elemental oxygen and at least one other gas, the process comprising:

compressing the first feed gas stream to produce a compressed first feed gas stream;

separating the second feed gas stream using an ion transport module containing an ion transport membrane having a retentate side and a permeate side to produce an oxygen-depleted gas stream on the retentate side and the pure oxygen gas stream or the oxygen-enriched gas stream on the permeate side;

heating at least the compressed first feed gas stream prior to injection into the furnace; and adding the pure oxygen gas stream or the oxygen-enriched gas stream to the first feed gas stream at any location before the first feed gas stream enters the furnace.

2. The process according to claim 1 wherein the furnace is a blast furnace.

3. The process according to claim 1 wherein the second feed gas stream comprises at least a portion of the compressed first feed gas stream or a compressed oxygen-enriched feed gas stream.

4. The process according to claim 1 wherein at least a portion of the oxygen-depleted gas stream is used as a purge stream to purge the permeate side of the ion transport membrane.

5. The process according to claim 1 wherein a portion of the first gas stream, after being heated, is directed to the retentate side of the ion transport membrane to comprise the second gas feed stream.

6. The process according to claim 5 wherein said portion of the heated first gas stream is added to an additional gas stream to comprise the second feed gas stream.

7. The process according to claim 1 including heating the second feed gas stream by transferring heat from at least one of the pure oxygen gas stream or oxygen-enriched gas stream and the oxygen-depleted gas stream to the second feed gas stream.

8. The process according to claim 7 wherein the pure oxygen gas stream or oxygen-enriched gas stream is cooled and further compressed by a booster compressor after the pure oxygen gas stream or oxygen-enriched gas stream undergoes heat exchange with the second feed gas stream.

9. The process according to claim 7 wherein a fuel gas stream is added to the oxygen-depleted gas stream for combustion before the oxygen-depleted gas stream undergoes heat exchange with the second feed gas stream.

10. The process according to claim 1 wherein a power expander is used to recover energy from the oxygen-depleted gas stream.

11. The process according to claim 1 wherein a fuel gas stream is added to the permeate side of the ion transport membrane for purging.

12. The process according to claim 1 wherein the first feed gas stream and the second feed gas stream are each air.

13. The process according to claim 1 wherein a portion of the second feed gas stream is used to purge the permeate side of the ion transport membrane.

14. A process for oxygen-enriching a first air stream containing elemental oxygen and at least one other gas to be fed into a blast furnace by utilizing a pure oxygen gas stream or an oxygen-enriched gas stream from a second air stream containing elemental oxygen and at least one other gas, said process comprising:

compressing the first air stream;

adding a fuel gas stream to an oxygen-depleted gas stream and then combusting the resultant gas stream;

heating the second air stream, which includes at least a portion of the compressed first air stream or a compressed oxygen-enriched air stream, by transferring heat to the second air stream from the pure oxygen gas stream or oxygen-enriched gas stream and the hot oxygen-depleted gas stream from which energy is also recovered using a power expander;

further compressing the cooled pure oxygen gas stream or oxygen-enriched gas stream using a booster compressor;

separating the heated second air stream using an ion transport module containing an ion transport membrane having a retentate side and a permeate side to produce the oxygen-depleted gas stream on the retentate side and the pure oxygen gas stream or the oxygen-enriched gas stream on the permeate side; and heating at least the compressed first air stream prior to injection into the blast furnace.

15. The process according to claim 14 wherein the pure oxygen gas stream or the oxygen-enriched gas stream is added to the first air stream at any location before the first air stream enters the blast furnace.

16. The process of claim 15 wherein at least a portion of the oxygen-depleted air stream is used as a purge stream to purge the permeate side of the ion transport membrane.

* * * * *